United States Patent
Wan et al.

(10) Patent No.: US 12,244,920 B2
(45) Date of Patent: Mar. 4, 2025

(54) ENERGY REDUCTION IN ALWAYS-ON INTELLIGENT SENSING FOR WEARABLE DEVICES

(71) Applicant: GOOGLE LLC, Mountain View, CA (US)

(72) Inventors: Chung Chun Wan, San Jose, CA (US); Ping Tong Chu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 224 days.

(21) Appl. No.: 17/823,986

(22) Filed: Sep. 1, 2022

(65) Prior Publication Data

US 2024/0080547 A1 Mar. 7, 2024

(51) Int. Cl.
*H04N 23/65* (2023.01)
*G06F 3/01* (2006.01)

(52) U.S. Cl.
CPC ........... *H04N 23/651* (2023.01); *G06F 3/011* (2013.01)

(58) Field of Classification Search
CPC .............................. H04N 23/651; G06F 3/011
See application file for complete search history.

(56) References Cited

U.S. PATENT DOCUMENTS

| | | |
|---|---|---|
| 2013/0271602 A1 | 10/2013 | Haas et al. |
| 2014/0267403 A1 | 9/2014 | Maciocci et al. |
| 2016/0011424 A1 | 1/2016 | Thurber et al. |
| 2016/0027141 A1 | 1/2016 | Patel et al. |
| 2021/0342008 A1* | 11/2021 | Sachidanandam .... G06F 3/0346 |

OTHER PUBLICATIONS

Sachidanandam et al., International Publication No. WO 2021021224 A1, published Feb. 4, 2021 (Year: 2021).*
"The Mobile Future of Augmented Reality Augmented Reality", Qualcomm Technologies, Inc.; (https://www.qualcomm.com/media/documents/files/the-mobile-future-of-augmented-reality.pdf), Oct. 2018, 49 pages.

* cited by examiner

*Primary Examiner* — Nicholas G Giles
(74) *Attorney, Agent, or Firm* — Brake Hughes Bellermann LLP (57) ABSTRACT

A wearable device can include a first sensor configured to sense first data, a second sensor configured to sense second data, an energy utilization of the first sensor being less than an energy utilization of the second sensor, and a processor configured to perform a comparison between the first data and a threshold value, if the comparison passes the threshold value, cause the second sensor to sense the second data and process the second data, and if the comparison fails the threshold value, cause the second sensor not to sense the second data.

20 Claims, 6 Drawing Sheets

ENERGY REDUCTION IN ALWAYS-ON INTELLIGENT SENSING FOR WEARABLE DEVICES

FIELD

Embodiments relate to energy consumption, e.g., battery usage, in wearable devices.

BACKGROUND

Wearable devices (e.g., augmented reality (AR) headsets, mixed reality (MR) headsets, virtual reality (VR) headsets, smart glasses, watches, and/or the like) can use sensors (e.g., camera, temperature, motion, position, and/or the like) to detect real-world information. Energy will be consumed when the sensors acquire, process and analyze the real-world information for always-on intelligent features. The wearable devices can include an energy storage device (e.g., a battery) with limited resources.

SUMMARY

In an example implementation, energy consumption of a wearable device can be minimized by using the data from a first sensor the determine whether or not data should be captured and processed from a second sensor. The first sensor can be configured to use low energy as compared to the second sensor.

In a general aspect, a device, a system, a non-transitory computer-readable medium (having stored thereon computer executable program code which can be executed on a computer system), and/or a method can perform a process with an apparatus including a first sensor configured to sense first data, a second sensor configured to sense second data, an energy utilization of the first sensor being less than an energy utilization of the second sensor, and a processor configured to perform a comparison between the first data and a threshold value, if the comparison passes the threshold value, cause the second sensor to sense the second data and process the second data, and if the comparison fails the threshold value, cause the second sensor not to sense the second data.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, and/or structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

It can be undesirable for the wearable device to use any energy when the real-world information is not needed and/or the real-world information is not useful. For example, if a user leaves the wearable device on a desk for a period of time, the real-world information may not be useful. For example, if the user is moving his/her head quickly (relative to camera shutter speed), captured images may not be useful to analyze because of motion blur. Therefore, in these (and many other) situations sensor energy use may be undesirable. Example implementations provide a technical solution to intelligently acquire and analyze information to preserve energy.

In an example use case, an always-on intelligent sensing system can include, for example, a camera, a motion sensor and a processor. The camera can be used to acquire real-world vision data periodically in a low power configuration. The processor can be used to control the camera and the motion sensor, to collect motion sensor data, and to process and analyze the vision and the motion data. The motion sensor can be used to acquire user head motion and determine whether the device is in stationary or in fast motion (linear or rotational motion). The processor can be programmed to sample the motion sensor periodically to determine whether the device is in a stationary or above a threshold motion state. If the wearable device is not in either state, an image can be acquired for analysis and processing. If the wearable device is in either state, no image may be acquired or processed. The motion sensor can require approximately 100 times less power than the camera and an image processor. Therefore, energy usage of the motion sensor can be negligible compared to the energy usage of the image capture and processing system. Accordingly, energy can be preserved by using the motion sensor to prevent capturing and processing an image.

Figure 1:
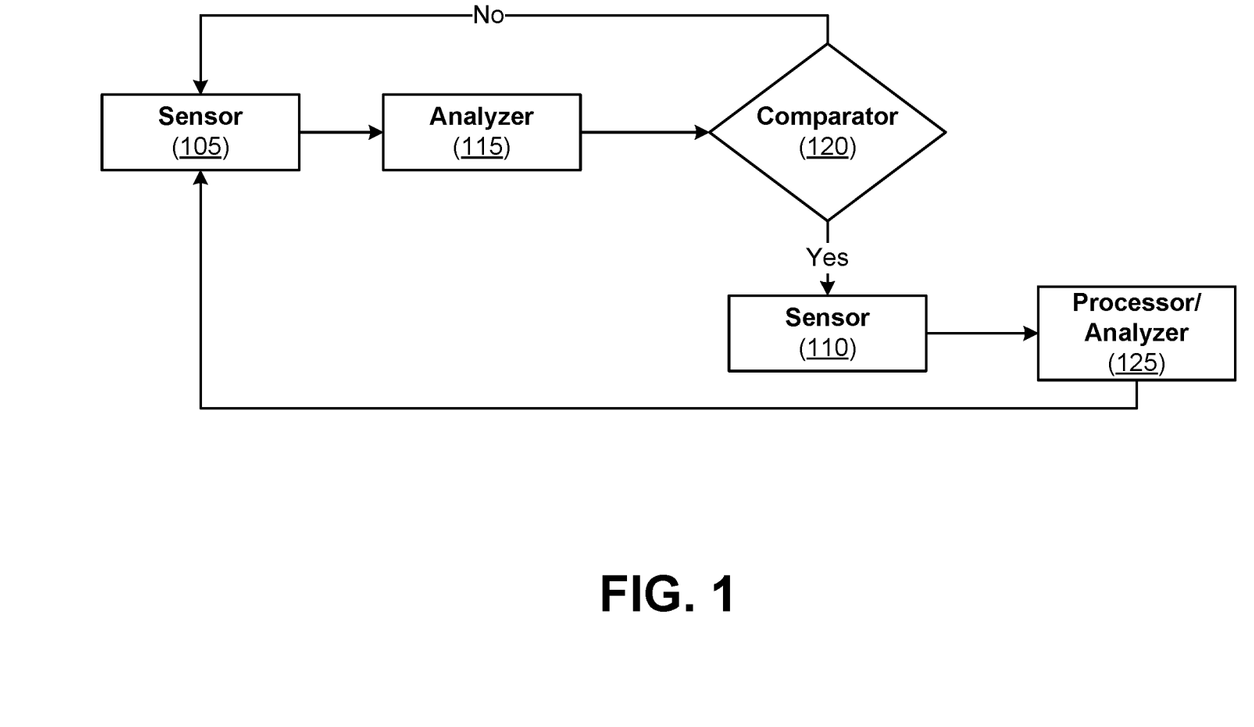
FIG. 1 illustrates a block diagram of a system according to an example implementation.

FIG. 1 illustrates a block diagram of a system according to an example implementation. As shown in FIG. 1, the system can include a sensor 105, a sensor 110, an analyzer 115, a comparator 120, and a processor/analyzer 125. The system can be a wearable device including, for example, an AR headset, a MR headset, a VR headset, ahead mount display (HMD), a smart glasses, a watch, a ring, a fitness device, and/or the like.

The sensor 105 can be, for example, an accelerometer, a gyroscope, a magnetometer, a global positioning system (GPS), a proximity sensor, an ambient light sensor, an ambient temperature sensor, a microphone, a camera and/or the like. The sensor 105 can be configured to sense (e.g., make a measurement, collect data, and/or the like) on a regular interval. For example, sensor 105 can be configured to sense every 10 ms, 30 ms, 50 ms, 1 sec, 2 sec, and/or the like. The sensor 105 can be an always-on intelligent sensor or an always-on sensor.

The sensor 110 can be, for example, an accelerometer, a gyroscope, a magnetometer, a global positioning system (GPS), a proximity sensor, an ambient light sensor, an ambient temperature sensor, a microphone, a camera and/or the like. The sensor 105 can consume fewer resources (e.g., energy, power, charge of a battery) as compared to the sensor 110. The sensor 110 can be configured to sense (e.g., make a measurement, collect data, and/or the like) on a regular interval. For example, sensor 105 can be configured to sense every 10 ms, 30 ms, 50 ms, 1 sec, 2 sec, and/or the like. The sensor 105 can be an always-on intelligent sensor or an always-on sensor. The sensor 110 can be triggered to sense. The sensor 110 can be triggered not to sense (e.g., prevented from sensing when configured to sense on a regular interval).

The analyzer 115 can be configured to analyze data received from the sensor 105. The analyzer 115 can be configured to convert the data into a format than can be analyzed. For example, sensor 105 can be an inertial measurement unit (IMU) including an accelerometer, and a gyroscope. The analyzer 115 can be configured to convert IMU data into motion data (e.g., amount and direction of wearable device movement, roll, pitch, yaw, and/or the like). The wearable device can use the motion data in the normal operation of the wearable device. In addition, the analyzer 115 can communicate the motion data to the comparator 120.

The comparator 120 can be configured to compare the received data to at least one threshold value. The comparator 120 can be configured to determine whether or not the compared data is acceptable or not. If the compared data is acceptable, the comparator 120 can be configured to cause sensor 110 to sense data and the processor/analyzer 125 to process the sensed data for the normal operation of the wearable device. If the compared data is not acceptable, the comparator 120 can be configured to prevent the sensor 110 from sensing data.

If the compared data is not acceptable, the sensor 110 can be caused not to sense. In an example implementation, if the compared data is not acceptable, a regular interval associated with the sensor 110 can be disabled. In other words, a regular interval sensing associated with the sensor 110 can be turned off. In an example implementation, if the compared data is not acceptable, a regular interval associated with the first sensor and/or the sensor 110 can be skipped. In an example implementation, if the compared data is not acceptable, a regular interval associated with the first sensor and/or the sensor 110 can be changed. For example, the regular interval associated with the sensor 105 and/or the sensor 110 can be changed from 10 ms to 50 ms. Thus, reducing energy consumption. In an example implementation, the sensor 110 can be two or more sensors.

For example, sensor 105 can be an IMU and sensor 110 can be a camera. As discussed above, an energy use reduction can be accomplished by preventing a sensor from sensing should the sensed data not be useful. Accordingly, preventing a camera (as sensor 110) from capturing an image when the image may not be useful can save energy. In an example implementation, the IMU (sensor 105) may consume less energy than the camera (as sensor 110) during normal operation. Therefore, using IMU data (e.g., motion data) to determine whether or not to use the camera (as sensor 110) to capture an image may conserve energy.

In a first use case, the wearable device may be on and not in use (e.g., stationary on a desk). In this case IMU data should indicate no motion (or substantially no motion). Therefore, comparator 120 can have a low motion threshold value that can be used to determine that the wearable device is not in use. If motion is below this threshold value, the camera (as sensor 110) can be prevented from capturing an image. Thus, conserving energy.

In a second use case, the wearable device may be on and moving or rotating rapidly. Therefore, any captured image is likely to be blurry and, therefore, not useful. In this case IMU data should indicate a substantial amount of motion. Therefore, comparator 120 can have a high motion threshold value that can be used to determine that the wearable device is moving or rotating rapidly. If motion is above this threshold value, the camera (as sensor 110) can be prevented from capturing an image. Thus, conserving energy. Instructions associated with the analyzer 115, the comparator 120, and the processor/analyzer 125 can be stored in a memory (e.g., memory 410 described below) and the instructions can be executed by a same processor (e.g., processor 205, 405 described below).

Figure 2:
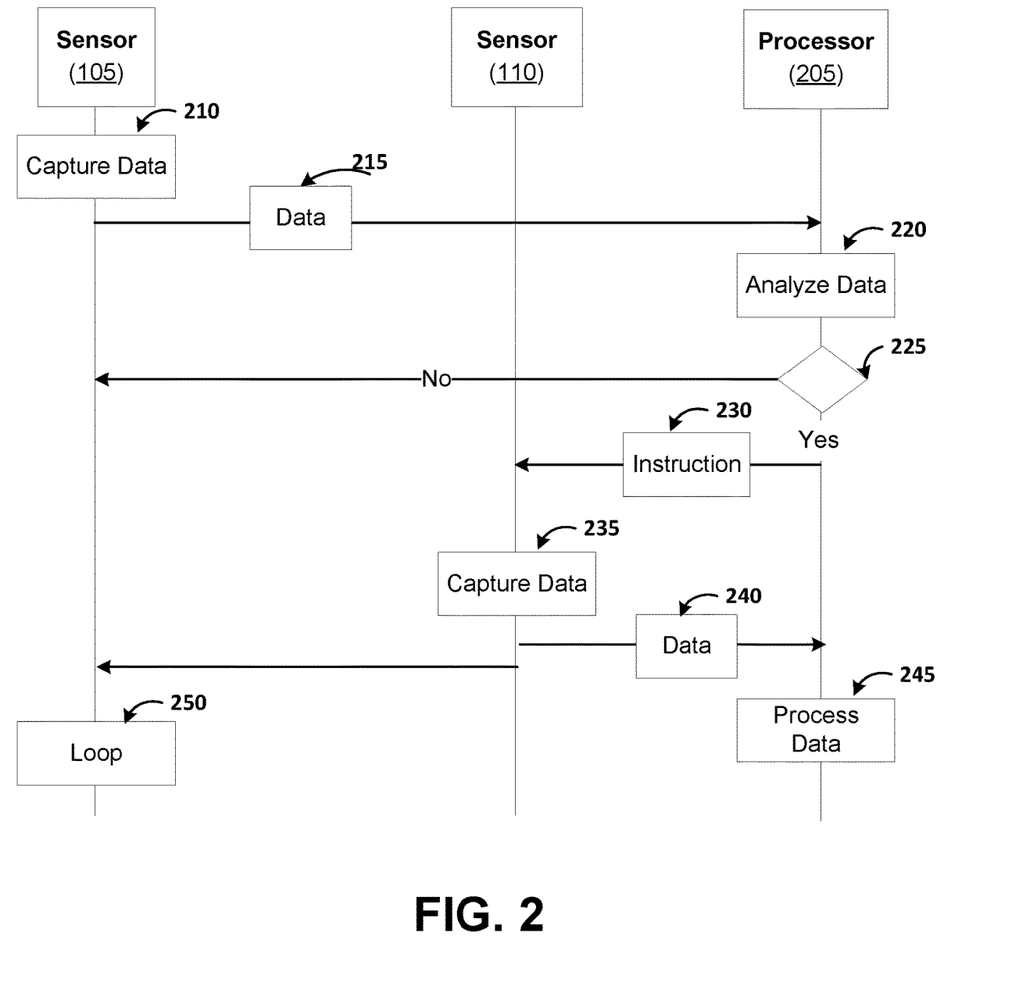
FIG. 2 illustrates a block diagram of a signal flow according to an example implementation.

FIG. 2 illustrates a block diagram of a signal flow according to an example implementation. As shown in FIG. 2, a system can include the sensor 105, the sensor 110, and a processor 205. The sensor 105 and the sensor 110 can be communicatively coupled (e.g., via a computer bus) to the processor 205. The system including the sensor 105, the sensor 110, and the processor 205 can be a wearable device. The wearable devices can be an AR headset, a MR headset, a VR headset, a smart glasses, a watch, a ring, a fitness device, and/or the like.

In block 210, the sensor 105 can capture data. The sensor 105 can be configured to sense every 10 ms, 30 ms, 50 ms, 1 sec, 2 sec, and/or the like. The sensor 105 can be an always-on intelligent sensor or an always-on sensor. As described above, the sensor 105 can be a motion sensor. For example, the sensor 105 can be an IMU including an accelerometer, a gyroscope. Further, as described above, using the IMU data to determine whether or not to use the camera (as sensor 110) to capture an image may conserve energy. In block 215, the sensor 105 communicates the data to the processor 205. The data can be communicated to the processor 205 via a bus (e.g., bus 415).

In block 220, the processor 205 analyzes the data. For example, the data can be converted into a format than can be analyzed. For example, the processor 205 can be configured to convert IMU data into motion data (e.g., amount and direction of wearable device movement, roll, pitch, yaw, and/or the like). The wearable device can use the motion data in the normal operation of the wearable device. In addition, in block 225, the processor can compare the analyzed data to at least one threshold value. If the analyzed data passes the comparison, in block 230 the processor 205 communicates an instruction to the sensor 110. The instruction 230 can cause the sensor 110 to sense data (e.g., make a measurement, capture data, capture an image, and/or the like). If the analyzed data fails the comparison, control is passed to the sensor 105.

In an alternate implementation, if the analyzed data fails the comparison, the instruction 230 can cause (e.g., trigger) the sensor 110 not to sense data when otherwise the sensor 110 would sense data on a regular interval. Then control is passed to the sensor 105. In this implementation, if the analyzed data passes the comparison, control is passed to the sensor 110 and processing can continue at block 235.

In block 235, the sensor 110 can capture data. For example, as described above, the sensor 110 can be a camera. Therefore, the sensor 110 can capture an image as the data. In block 240, the sensor 110 communicates the data to the processor 205. In addition, control is passed to the sensor 105.

In block 245, the processor 205 can process the data. For example, the processor 205 can process the data (e.g., an image) in the normal operation of the wearable device. In block 250, the signal flow loops, and processing returns to block 210.

Figure 3:
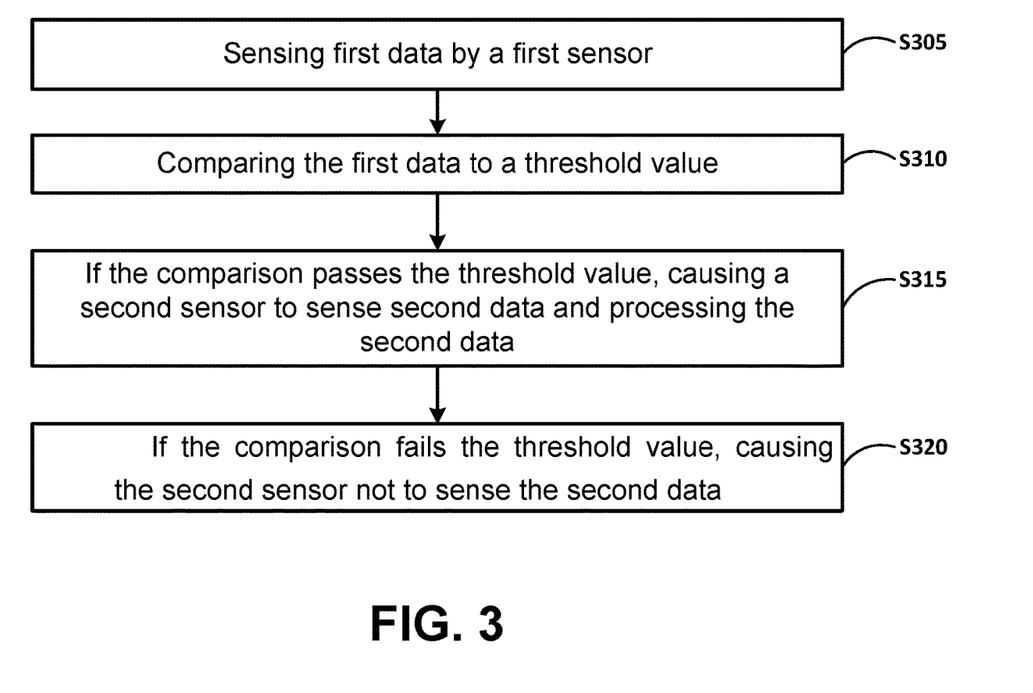
FIG. 3 illustrates a block diagram of a method according to an example implementation.

FIG. 3 illustrates a block diagram of a method according to an example implementation. As shown in FIG. 3, in step S305 sensing first data by a first sensor. For example, sensor can be configured to sense every 10 ms, 30 ms, 50 ms, 1 sec, 2 sec, and/or the like. The sensor can be an always-on intelligent sensor or an always-on sensor. The sensor can be an IMU and the IMU data can be converted into motion data (e.g., amount and direction of wearable device movement, roll, pitch, yaw, and/or the like).

In step S310 comparing the first data to a threshold value. For example, the first data can be motion data. In a first use case, a wearable device may be on and not in use (e.g., stationary on a desk). In this case, the first data should indicate no motion (or substantially no motion). Therefore, a low motion threshold value can be used to determine that the wearable device is not in use. In a second use case, the wearable device may on and moving or rotating rapidly. Therefore, any captured image is likely to be blurry and, therefore, not useful. In this case the first data should indicate a substantial amount of motion. Therefore, a high motion threshold value can be used to determine that the wearable device is moving or rotating rapidly.

In step S315 if the comparison passes the threshold value, causing a second sensor to sense a second data, and processing the second data. In an example implementation, an energy utilization of the first sensor can be less than an energy utilization of the second sensor. For example, the second sensor can be a camera and the second data can be an image. Therefore, if the comparison passes the threshold value, an image can be captured and processed.

In step S320 if the comparison fails the threshold value, causing the second sensor not to sense the second data. In an example implementation, if the comparison fails the threshold value, the regular interval associated with the second sensor can be disabled. For example, the second sensor can be a camera and the second data can be an image. Therefore, if the comparison fails the threshold value the camera can be prevented from capturing an image. Thus, energy can be conserved.

Figure 4:
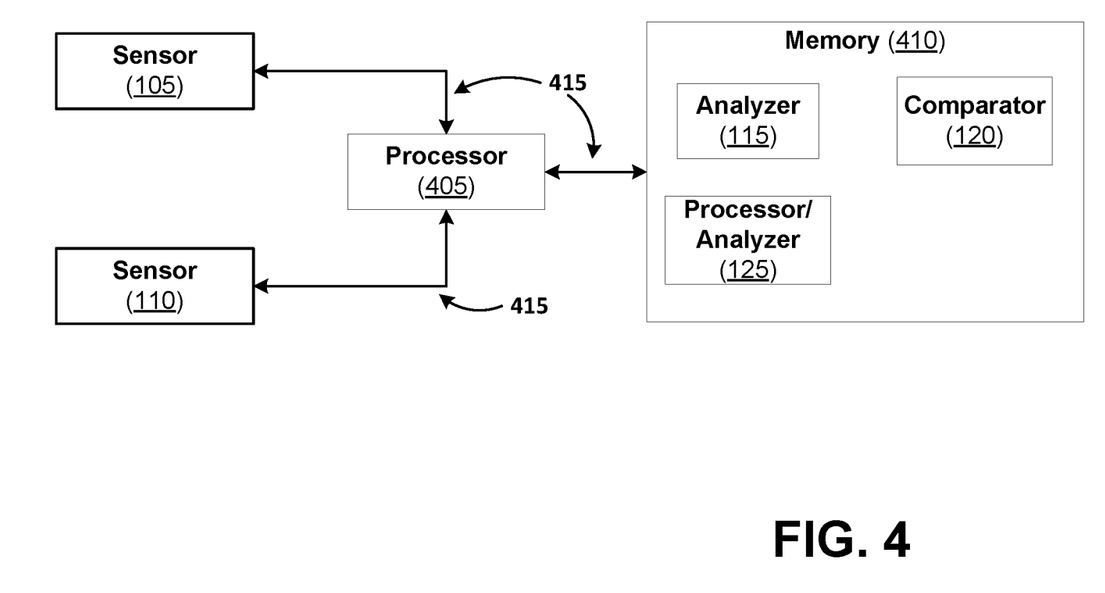
FIG. 4 illustrates a block diagram of a system according to an example implementation.

FIG. 4 illustrates a block diagram of a system according to an example implementation. In the example of FIG. 4, the system (e.g., an AR/MR/VR system, a wearable device, and the like) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 405 and a memory 410 (e.g., a non-transitory computer readable memory). The processor 405 and the memory 410 can be coupled (e.g., communicatively coupled) by a bus 415.

The processor 405 may be utilized to execute instructions stored on the at least one memory 410. Therefore, the processor 405 can implement the various features and functions described herein, or additional or alternative features and functions. The processor 405 and the at least one memory 410 may be utilized for various other purposes. For example, the at least one memory 410 may represent an example of various types of memory and related hardware and software which may be used to implement any one of the modules described herein.

The at least one memory 410 may be configured to store data and/or information associated with the device. The at least one memory 410 may be a shared resource. Therefore, the at least one memory 410 may be configured to store data and/or information associated with other elements (e.g., image/video processing or wired/wireless communication) within the larger system. Together, the processor 405 and the at least one memory 410 may be utilized to implement the techniques described herein. As such, the techniques described herein can be implemented as code segments (e.g., software) stored on the memory 410 and executed by the processor 405. Accordingly, the memory 410 can include the analyzer 115, the comparator 120, and the processor/analyzer 125.

None, one, or more of the elements described with regard to FIG. 4 can be implemented using a split computing system. For example, a companion device including a processor and memory can be communicatively coupled with the wearable device. Accordingly, one or more of the analyzer 115, the comparator 120, and/or the processor/analyzer 125 can be implemented in the companion device and the result of the execution the analyzer 115, the comparator 120, and/or the processor/analyzer 125 can be communicated to the wearable device (e.g., wearable device 500).

Figure 5:
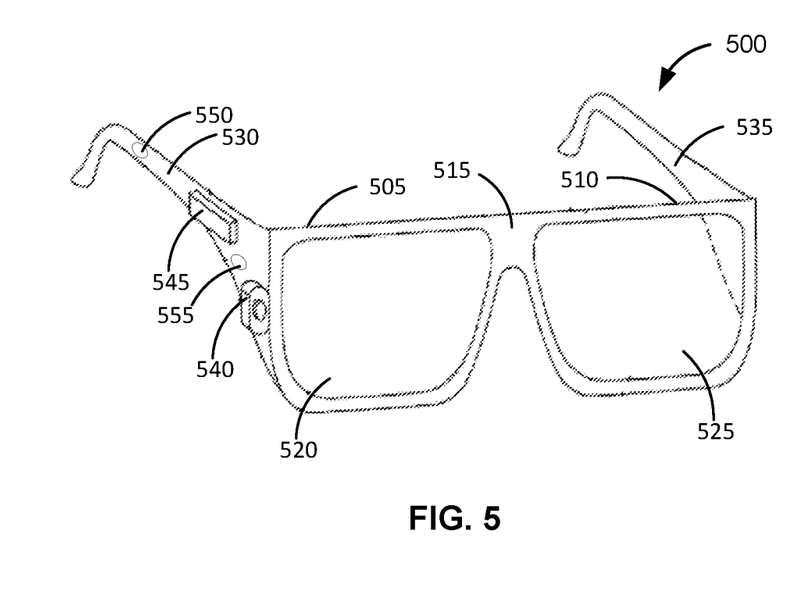
FIG. 5 illustrates a wearable device according to an example implementation.

FIG. 5 illustrates a wearable device according to an example implementation. As shown in FIG. 5, a wearable device 500 includes lens frame 505, lens frame 510, center frame support 515, lens element 520, lens element 525, extending side-arm 530, extending side-arm 535, image capture device 540 (e.g., a camera), on-board computing system 545, speaker 550, and microphone 555.

Each of the frame elements 505, 510, and 515 and the extending side-arms 530, 535 can be formed of a solid structure of plastic and/or metal or can be formed of a hollow structure of similar material so as to allow wiring and component interconnects to be internally routed through the wearable device 500. Other materials can be possible as well. At least one of the lens elements 520, 525 can be formed of any material that can suitably display a projected image or graphic. Each of the lens elements 520, 525 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 515 and the extending side-arms 530, 535 are configured to secure the wearable device 500 to a user's face via a user's nose and ears, respectively. The extending side-arms 530, 535 can each be projections that extend away from the lens-frames 505, 510, respectively, and can be positioned behind a user's ears to secure the wearable device 500 to the user. The extending side-arms 530, 535 can further secure the wearable device 500 to the user by extending around a rear portion of the user's head. Additionally, or alternatively, for example, the wearable device 500 can connect to or be affixed within a head-mounted helmet structure. Other configurations for a wearable computing device are also possible.

The on-board computing system 545 is shown to be positioned on the extending side-arm 530 of the wearable device 500; however, the on-board computing system 545 can be provided on other parts of the wearable device 500 or can be remotely positioned from the wearable device 500 (e.g., the on-board computing system 545 could be wire- or wirelessly-connected to the wearable device 500). The on-board computing system 545 can include a processor and memory, for example. The on-board computing system 545 can be configured to receive and analyze data from the image capture device 540 (and possibly from other sensory devices) and generate images for output by the lens elements 520, 525.

The image capture device 540 can be, for example, a camera that is configured to capture still images and/or to capture video. In the illustrated configuration, image capture device 540 is positioned on the extending side-arm 530 of the wearable device 500; however, the image capture device 540 can be provided on other parts of the wearable device 500. The image capture device 540 can be configured to capture images at various resolutions or at different frame rates. Many image capture devices with a small form-factor, such as the cameras used in mobile phones or webcams, for example, can be incorporated into an example of the wearable device 500.

One image capture device 540 is illustrated. However, more image capture devices can be used, and each can be configured to capture the same view, or to capture different views. For example, the image capture device 540 can be forward facing to capture at least a portion of the real-world view perceived by the user. This forward-facing image captured by the image capture device 540 can then be used to generate an augmented reality where computer generated images appear to interact with or overlay the real-world view perceived by the user.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above. Some implementations can be described by way of example. These examples may or may not be combined.

Example 1: A wearable device can include a first sensor configured to sense first data, a second sensor configured to sense second data, an energy utilization of the first sensor being less than an energy utilization of the second sensor, and a processor configured to perform a comparison between the first data and a threshold value, if the comparison passes the threshold value, cause the second sensor to sense the second data and process the second data, and if the comparison fails the threshold value, cause the second sensor not to sense the second data.

Example 2: The wearable device of Example 1, wherein the first sensor can be a motion sensor, the second sensor can be a camera, and if the comparison fails the threshold value, the camera may not capture an image.

Example 3: The wearable device of Example 1, wherein the first sensor can be configured to sense the first data on a regular interval.

Example 4: The wearable device of Example 1, wherein the first sensor can be an always-on sensor, and the second sensor can be an always-on sensor.

Example 5: The wearable device of Example 1, wherein the threshold value can include a low motion threshold value and a high motion threshold value.

Example 6: The wearable device of Example 1, wherein the first sensor can be configured to sense the first data on a regular interval, the second sensor can be configured to sense the second data on a regular interval, and if the comparison fails the threshold value, the second sensor may not sense the second data in at least one configured interval.

Example 7: The wearable device of Example 1, wherein the first sensor can be configured to sense the first data on a regular interval, the second sensor can be configured to sense the second data on a regular interval, and if the comparison fails the threshold value, the regular interval associated with the second sensor can be disabled.

Example 8: The wearable device of Example 1, wherein the first sensor can be configured to sense the first data on a regular interval, the second sensor can be configured to sense the second data on a regular interval, and if the comparison fails the threshold value, the regular interval associated with the first sensor and the second sensor can be changed.

Example 9: The wearable device of Example 1, wherein the second sensor can be a plurality of sensors, and if the comparison fails the threshold value, the plurality of sensors can be prevented from sensing the second data.

Example 10. A non-transitory computer-readable storage medium comprising instructions stored thereon that, when executed by at least one processor, are configured to cause a computing system to perform any steps associated with any of Examples 1-9.

Example 11. An apparatus comprising means for performing any steps associated with any of Examples 1-9.

Example 12. An apparatus comprising at least one processor and at least one memory including computer program code, the at least one memory and the computer program code configured to, with the at least one processor, cause the apparatus at least to perform any steps associated with any of Examples 1-9.

Figure 6:
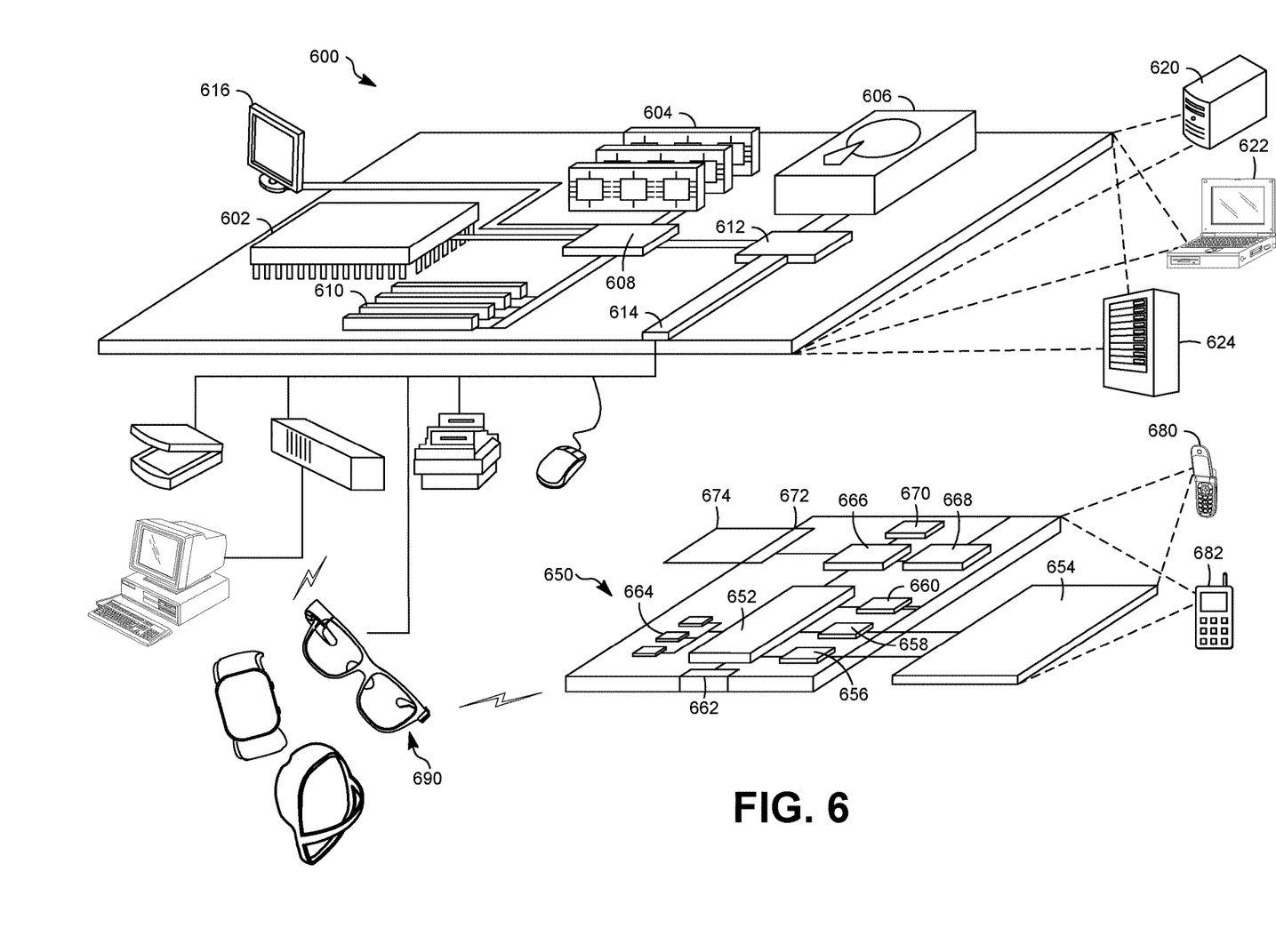
FIG. 6 shows an example of a computer device and a mobile computer device according to at least one example embodiment.

FIG. 6 illustrates an example of a computer device 600 and a mobile computer device 650, which may be used with the techniques described here (e.g., to implement the devices described herein). The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), and LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset 690 for example, as movements on the rendered touchpad in the AR space. The rendered movements can control virtual objects in the AR space.

In some implementations, one or more output devices included on the computing device 650 can provide output and/or feedback to a user of the AR headset 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A wearable device comprising:
   a first sensor configured to sense first data;
   a second sensor configured to sense second data, an energy utilization of the first sensor being less than an energy utilization of the second sensor; and
   a processor configured to:
   perform a comparison between the first data and a first threshold value,
   if the comparison passes the first threshold value, perform a comparison between the first data and a second threshold value,
   if the comparison passes the second threshold value, cause the second sensor to sense the second data and process the second data, and
   if the comparison fails the first threshold value or the comparison fails the second threshold value, cause the second sensor not to sense the second data.

2. The wearable device of claim 1, wherein
   the first sensor is a motion sensor,
   the second sensor is a camera, and
   if the comparison fails the first threshold value or the comparison fails the second threshold value, the camera does not capture an image.

3. The wearable device of claim 1, wherein the first sensor is configured to sense the first data on a regular interval.

4. The wearable device of claim 1, wherein
   the first sensor is an always-on sensor, and
   the second sensor is an always-on sensor.

5. The wearable device of claim 1, wherein the first threshold value includes a low motion threshold value and the second threshold value includes a high motion threshold value.

6. The wearable device of claim 1, wherein
   the first sensor is configured to sense the first data on a first interval,
   the second sensor is configured to sense the second data on a second interval, and
   if the comparison fails the first threshold value or the comparison fails the second threshold value, the second sensor does not sense the second data in at least one configured interval.

7. The wearable device of claim 1, wherein
   the first sensor is configured to sense the first data on a first interval,
   the second sensor is configured to sense the second data on a second interval, and
   if the comparison fails the first threshold value or the comparison fails the second threshold value, the second interval associated with the second sensor is disabled.

8. The wearable device of claim 1, wherein
   the first sensor is configured to sense the first data on a first interval, the second sensor is configured to sense the second data on a second interval, and
if the comparison fails the first threshold value or the comparison fails the second threshold value, the first interval associated with the first sensor and the second sensor is changed.

9. The wearable device of claim 1, wherein
the second sensor is a plurality of sensors, and
if the comparison fails the first threshold value or the comparison fails the second threshold value, the plurality of sensors are prevented from sensing the second data.

10. An apparatus comprising:
a first sensor configured to sense first data;
a second sensor configured to sense second data, an energy utilization of the first sensor being less than an energy utilization of the second sensor;
at least one processor; and
at least one memory including computer program code, the at least one memory and the computer program code configured to, with the at least one processor, cause the apparatus to:
perform a comparison between the first data and a first threshold value,
if the comparison passes the first threshold value, perform a comparison between the first data and a second threshold value,
if the comparison passes the second threshold value, cause the second sensor to sense the second data and process the second data, and
if the comparison fails the first threshold value or the comparison fails the second threshold value, cause the second sensor not to sense the second data.

11. The apparatus of claim 10, wherein
the first sensor is a motion sensor,
the second sensor is a camera, and
if the comparison fails the first threshold value or the comparison fails the second threshold value, the camera does not capture an image.

12. The apparatus of claim 10, wherein the first sensor is configured to sense the first data on a regular interval.

13. The apparatus of claim 10, wherein
the first sensor is an always-on sensor, and
the second sensor is an always-on sensor.

14. The apparatus of claim 10, wherein the first threshold value includes a low motion threshold value and the second threshold value includes a high motion threshold value.

15. The apparatus of claim 10, wherein
the first sensor is configured to sense the first data on a first interval,
the second sensor is configured to sense the second data on a second interval, and
if the comparison fails the first threshold value or the comparison fails the second threshold value, the second sensor does not sense the second data in at least one configured interval.

16. The apparatus of claim 10, wherein
the first sensor is configured to sense the first data on a first interval,
the second sensor is configured to sense the second data on a second interval, and
if the comparison fails the first threshold value or the comparison fails the second threshold value, the second interval associated with the second sensor is disabled.

17. The apparatus of claim 10, wherein
the first sensor is configured to sense the first data on a first interval,
the second sensor is configured to sense the second data on a second interval, and
if the comparison fails the first threshold value or the comparison fails the second threshold value, the first interval associated with the first sensor and the second sensor is changed.

18. The apparatus of claim 10, wherein
the second sensor is a plurality of sensors, and
if the comparison fails the first threshold value or the comparison fails the second threshold value, the plurality of sensors are prevented from sensing the second data.

19. A method of operating a wearable device, the method comprising:
sensing first data by a first sensor of the wearable device;
sensing second data by a second sensor of the wearable device, an energy utilization of the first sensor being less than an energy utilization of the second sensor; and
performing, by a processor of the wearable device, a comparison between the first data and a first threshold value,
if the comparison passes the first threshold value, perform a comparison between the first data and a second threshold value,
if the comparison passes the second threshold value, cause the second sensor to sense the second data and process the second data, and
if the comparison fails the first threshold value or the comparison fails the second threshold value, cause the second sensor not to sense the second data.

20. The method of claim 19, wherein
the first sensor is a motion sensor,
the second sensor is a camera, and
if the comparison fails the first threshold value or the comparison fails the second threshold value, the camera does not capture an image.

* * * * *